(12) United States Patent
Morita (10) Patent No.: US 11,225,210 B2
(45) Date of Patent: Jan. 18, 2022

(54) VEHICLE POWER SUPPLY SYSTEM AND POWER SUPPLY CONTROL DEVICE

(71) Applicant: DENSO CORPORATION, Kariya (JP)

(72) Inventor: Yoshinori Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/826,435

(22) Filed: Mar. 23, 2020

(65) Prior Publication Data
US 2020/0216003 A1 Jul. 9, 2020

Related U.S. Application Data

(63) Continuation of application No. PCT/JP2018/035128, filed on Sep. 21, 2018.

(30) Foreign Application Priority Data

Sep. 22, 2017 (JP) .............................. JP2017-182553

(51) Int. Cl.
*B60L 7/16* (2006.01)
*B60R 16/033* (2006.01)
*B60R 16/04* (2006.01)

(52) U.S. Cl.
CPC .............. *B60R 16/033* (2013.01); *B60L 7/16* (2013.01); *B60R 16/04* (2013.01)

(58) Field of Classification Search
CPC .... B60L 1/00; B60L 1/003; B60L 1/20; B60L 7/10–18; B60R 16/03; B60R 16/0307; B60R 16/033; B60R 16/04
(Continued)

(56) References Cited

U.S. PATENT DOCUMENTS

2001/0041952 A1* 11/2001 Nada .......................... B60L 3/12
701/22
2002/0023789 A1* 2/2002 Morisawa .............. B60K 6/547
180/65.25
(Continued)

FOREIGN PATENT DOCUMENTS

JP 5106632 B2 12/2012
JP 2014-045631 A 3/2014
(Continued)

OTHER PUBLICATIONS

Dec. 4, 2018 International Search Report issued in International patent Application No. PCT/JP2018/035128.

*Primary Examiner* — Levi Gannon
(74) *Attorney, Agent, or Firm* — Oliff PLC (57) ABSTRACT

A vehicle power supply system, a controlled unit is connected to a controllee power supply system that is one of a first power supply system and a second power supply system of the vehicle power supply system. A parameter acquiring unit is connected to a controller power supply system that is another one of the first power supply system and the second power supply system and configured to acquire a parameter indicating a sign of voltage change of the controllee power supply system. An operation setting unit is configured to predict the voltage change of the controllee power supply system in response to the sign indicated by the parameter and set a power supply state of the controlled unit indicating at least one of a number of drive pulses per unit time, a duty ratio, and a drive current so as to obtain a constant output from the controlled unit.

20 Claims, 6 Drawing Sheets

(58) Field of Classification Search
USPC .......................................................... 307/10.1
See application file for complete search history.

(56) References Cited

U.S. PATENT DOCUMENTS

| | | | |
|---|---|---|---|
| 2003/0160510 A1* | 8/2003 | Mizutani | F02N 11/0814 307/10.1 |
| 2004/0129465 A1* | 7/2004 | Yamaguchi | B60L 58/20 180/65.24 |
| 2006/0097577 A1* | 5/2006 | Kato | F02N 11/0866 307/10.1 |
| 2009/0255493 A1* | 10/2009 | Ichimoto | B60L 15/20 123/90.11 |
| 2010/0207559 A1* | 8/2010 | Imai | B60K 6/445 318/400.23 |
| 2011/0001352 A1* | 1/2011 | Tamura | B60L 58/15 307/9.1 |
| 2013/0140883 A1* | 6/2013 | Tawada | H02J 13/00016 307/9.1 |
| 2015/0035356 A1* | 2/2015 | Sakata | H02J 7/16 307/9.1 |
| 2015/0291039 A1* | 10/2015 | Sakata | H01M 10/482 307/10.1 |
| 2016/0090052 A1* | 3/2016 | Nishijima | B60R 16/0238 307/9.1 |
| 2018/0022223 A1* | 1/2018 | Fukushima | B60R 16/03 701/22 |

FOREIGN PATENT DOCUMENTS

| | | |
|---|---|---|
| JP | 2015-077933 A | 4/2015 |
| JP | 2017-135947 A | 8/2017 |

\* cited by examiner

VEHICLE POWER SUPPLY SYSTEM AND POWER SUPPLY CONTROL DEVICE

CROSS-REFERENCE TO RELATED APPLICATION

The present international application claims priority based on Japanese Patent Application No. 2017-182553 filed with the Japan Patent Office on Sep. 22, 2017, the entire content of which is incorporated herein by reference.

BACKGROUND

Technical Field

The present disclosure relates to a vehicle power supply system having a plurality of power supply systems, and a power supply control device.

Related Art

A technique is known, in which, in a vehicle power supply system having a single power supply system, a control unit sets operating conditions of a drive pulse rate, or the like, for a controlled unit such as a fuel pump connected to this power supply system in response to a voltage of the power supply system.

DESCRIPTION OF SPECIFIC EMBODIMENTS

In recent years, a vehicle power supply system having a plurality of power supply systems, such as a hybrid vehicle, has been employed. As a result of detailed studies by the inventor, there has been found an issue that, in a case where the known technique, as disclosed in JP-B-5106632, is employed in such a configuration, and in a case where an operation setting unit and a controlled unit are connected to different power supply systems, because the operation setting unit cannot recognize a voltage of another power supply system, there is a possibility that the controlled unit cannot be caused to operate favorably.

In view of the foregoing, it is desired to have a technique for enabling a controlled unit to operate favorably in a configuration where a plurality of power supply systems are provided.

Hereinafter, the present embodiment will be described with reference to the accompanying drawings. In order to facilitate understanding of the description, the same structural elements in the drawings share the same reference signs wherever possible, and overlapping description is omitted.

1. First Embodiment

1-1. Configuration

Figure 1:
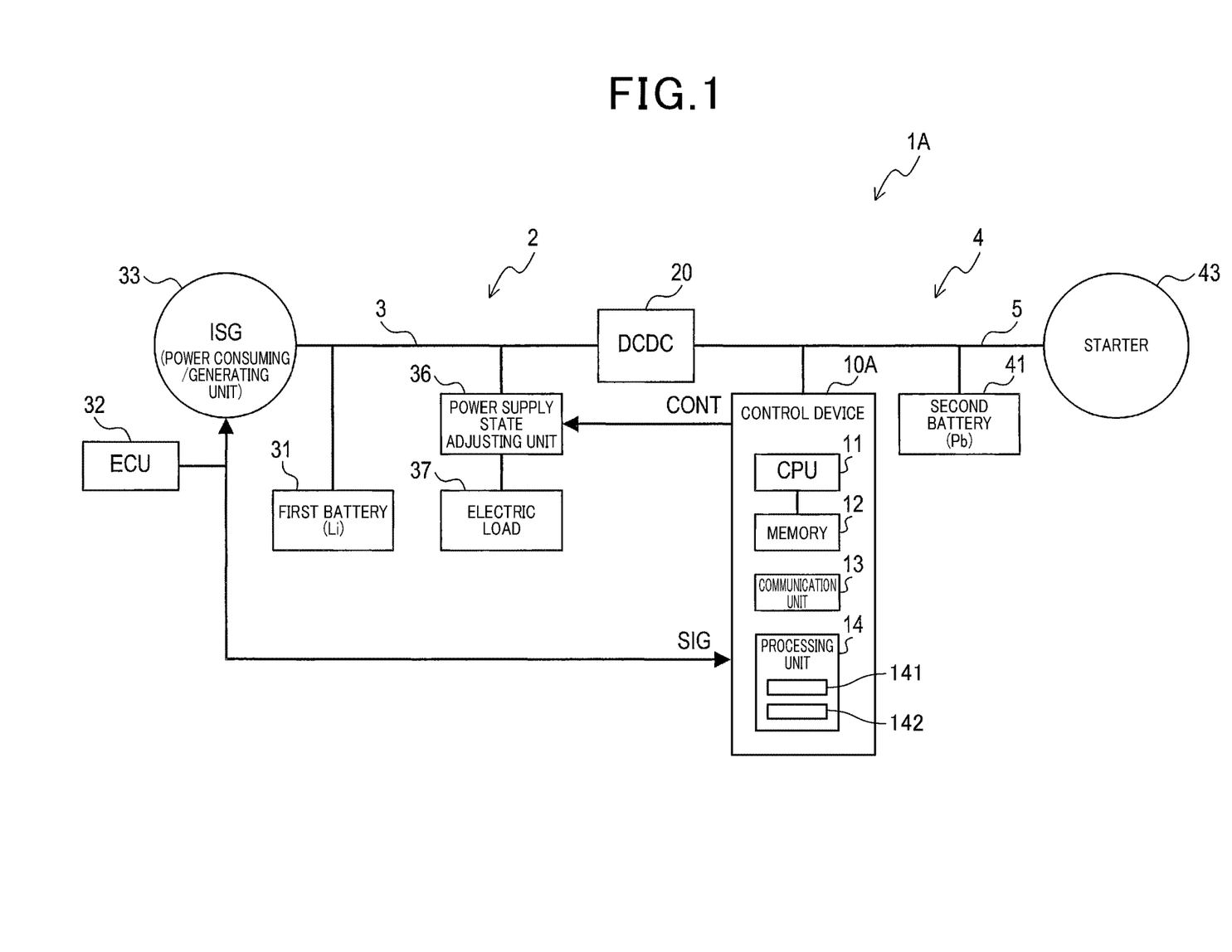
FIG. 1 is a block diagram illustrating a configuration of a vehicle power supply system according to a first embodiment.

A vehicle power supply system 1A illustrated in FIG. 1 is mounted on a vehicle such as, for example, a passenger car, and has a function of controlling a power supply state to an electric load 37 in response to a voltage of a power supply system to which the electric load 37 to be controlled is connected. Note that the power supply system refers to a configuration including a single power supply line and one or a plurality of pieces of equipment which receive power supply from this power supply line. Different power supply systems receive power supply from different power supply lines.

The vehicle power supply system 1A includes a first battery 31, a second battery 41, the electric load 37, and a control device 10A. Further, the vehicle power supply system 1A may include an ECU 32, an ISG 33, a DC-DC converter 20, a starter 43, a power supply state adjusting unit 36, or the like.

The vehicle power supply system 1A includes a first power supply system 2 and a second power supply system 4. Although a case where two power supply systems are provided will be described here, there may be three or more power supply systems.

The first battery 31 is configured as, for example, a lithium ion battery with a rated voltage set at 48 V, and is connected to the first power supply system 2. The first power supply system 2 includes a first power supply line 3 which connects the first battery 31 and other equipment, and a voltage of the first power supply system 2 is maintained at approximately 48 V by the first battery 31.

The second battery 41 is configured as, for example, a lead storage battery with a rated voltage set at 12 V, and is connected to a second power supply system 4 which is a power supply system different from the first power supply system 2. The second power supply system includes a second power supply line 5 which connects the second battery 41 and other equipment, and a voltage of the second power supply system is maintained at approximately 12 V by the second battery 41.

With the above configuration, energy density of the first battery 31 which is a lithium ion battery, is configured to be higher than energy density of the second battery 41 which is a lead storage battery.

The electric load 37 is arbitrary electrical equipment which operates by receiving power supply from the first power supply system 2. The electric load 37 of the present embodiment is connected to the first power supply line 3 of the first power supply system 2 via the power supply state adjusting unit 36. In the present embodiment, for example, an electric fuel pump driven by a drive pulse is exemplified as the electric load 37.

In accordance with a command from the control device 10A, the power supply state adjusting unit 36 adjusts a power supply state which is a mode when a voltage and a current are supplied to the electric load 37, so that substantially constant output can be obtained from the electric load 37 regardless of a voltage of the power supply system to which the electric load 37 is connected. The power supply state indicates at least one of the number of drive pulses per unit time, a duty ratio, a drive current, or the like.

The ECU 32 is a known electronic control device which performs predetermined calculation and performs communication via a communication line which is not illustrated. The ECU 32 calculates how to drive the ISG 33 based on various kinds of information flowing through the communication line, and based on this calculation result, transmits drive information for controlling an operating state of the ISG 33 to the ISG 33. The operating state of the ISG 33 is represented by drive torque, rotation speed, or the like. Note that the ISG 33 is a generator with a motor function, and ISG is an abbreviation for Integrated Starter Generator.

The drive information includes a drive request for requesting the ISG 33 to start driving, an operating amount request which represents a request value of the operating state of the ISG 33, or the like. Note that information transmitted from the ECU 32 to the ISG 33 is configured so as to be able to be recognized by the control device 10A via a communication line.

In a so-called hybrid vehicle, the ISG 33 has a function of performing regenerative power generation using kinetic energy of the vehicle and supplying the generated power to the first power supply system 2, and a function of operating by receiving power supply from the first power supply system 2 and supplying power to the vehicle. That is, the ISG 33 functions as a power consuming/generating unit which consumes power or generates power.

The DC-DC converter 20 is a known DC-DC converter which connects the first power supply line 3 of the first power supply system 2 and the second power supply line 5 of the second power supply system 4. The DC-DC converter 20 has a function of transforming a voltage of one of the first power supply system 2 and the second power supply system 4 to an appropriate voltage and supplying the voltage to the other one of the first power supply system 2 and the second power supply system 4.

The starter 43 is a known starter which starts an engine of the vehicle. The starter 43 is connected to the second power supply line 5 of the second power supply system 4.

The control device 10A is mainly configured with a known microcomputer including a CPU 11 and a semiconductor memory (hereinafter, a memory 12) such as a RAM, a ROM, and a flash memory.

The control device 10A is connected to the second power supply line 5 of the second power supply system 4, which is a power supply system different from the electric load 37.

Various kinds of functions of the control device 10A are realized by the CPU 11 executing programs stored in a non-transitory computer readable recording medium. In this example, the memory 12 corresponds to such a non-transitory computer readable recording medium.

Further, as a result of these program being executed, methods corresponding to the respective programs can be executed. Note that the non-transitory computer readable recording medium refers to recording media except for electromagnetic waves. Further, there may be one or more microcomputers which constitute the control device 10A.

The control device 10A includes a processing unit 14 whose functions are realized by the CPU 11 executing programs. A method for realizing these functions constituting the control device 10A is not limited to software, but some or all of the functions may be realized using one or more pieces of hardware. For example, in a case where these functions are realized by an electronic circuit which is hardware, the electronic circuit may be realized by a digital circuit including a number of logic circuits, an analog circuit, or a combination thereof.

With these functions of the processing unit 14 in the control device 10A, the power supply state of the electric load 37 is controlled by the CPU 11 performing power supply control processing which will be described later. Further, the control device 10A further includes a communication unit 13 which performs communication with other equipment. The communication unit 13 is configured as a known communication module, and is utilized for performing communication with the ECU 32, the ISG 33, the power supply state adjusting unit 36, or the like.

1-2. Power Supply Control Processing

Figure 2:
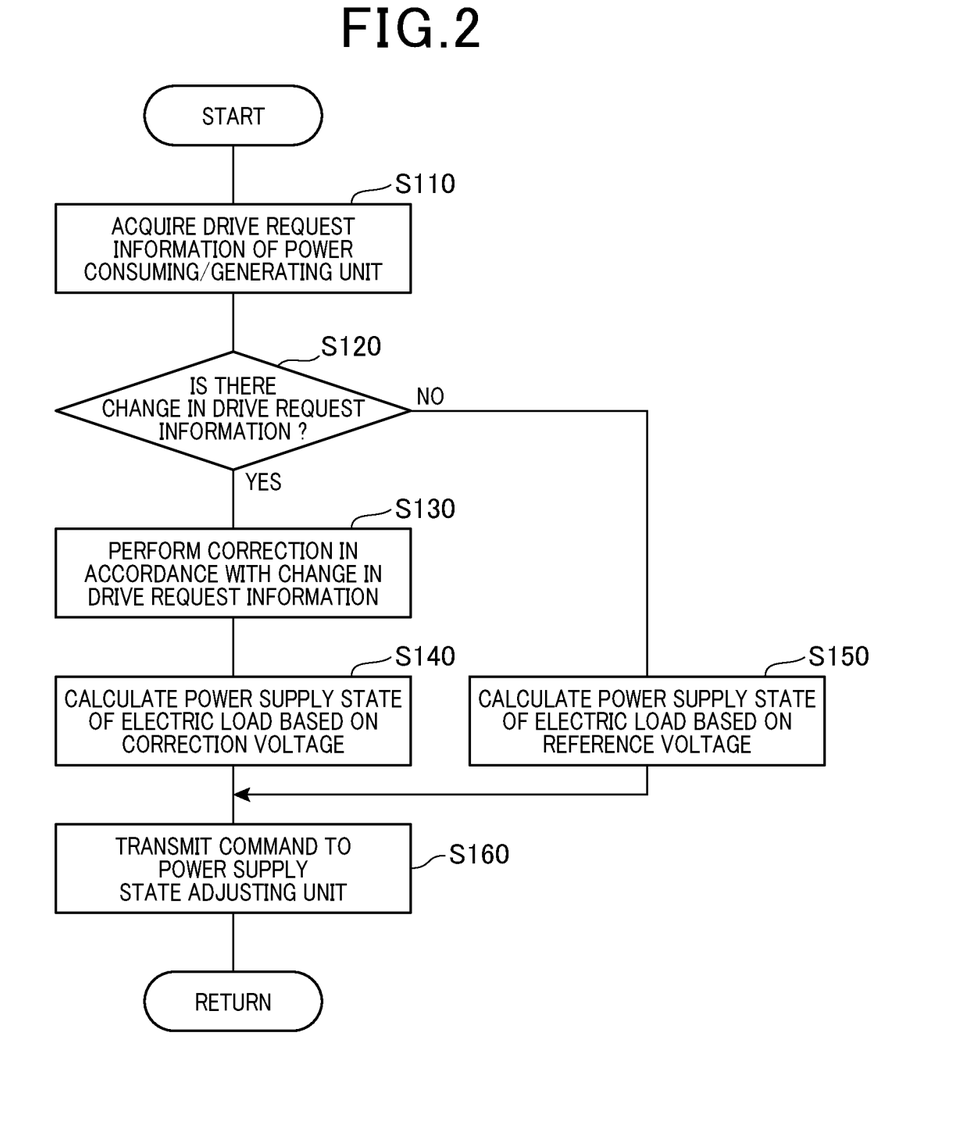
FIG. 2 is a flowchart of power supply control processing.

Next, the power supply control processing to be executed by the control device 10A will now be described with reference to the flowchart in FIG. 2. The power supply control processing is, for example, processing which is started when the vehicle is powered on and is repeatedly executed thereafter.

In the control device 10A, as shown in FIG. 1, the processing unit 14 includes a parameter acquiring unit 141 and an operation setting unit 142. In the power supply control processing, the parameter acquiring unit 141 performs processing of acquiring a parameter indicating a sign of voltage change of the first power supply system 2 to which the electric load 37 is connected, and the operation setting unit 142 performs processing of setting the power supply state of the electric load 37 in response to the sign indicated by the parameter.

First, in step S110, the control device 10A acquires drive request information of the ISG 33 which is a power consuming/generating unit. The drive request information is the above-described drive information or information for judging whether or not drive information will be transmitted from the ECU 32 in the future (hereinafter, referred to as judgment information). The judgment information may include an accelerator position, a brake control amount, or the like. The judgment information is obtained through a communication line, or the like.

That is, because operating conditions of the ISG 33 include a change in the accelerator position and the brake control amount, it is possible to predict that the operating state of the ISG 33 will change by monitoring them. Therefore, it can be said that the judgment information, and hence the drive request information, is a parameter indicating a sign of voltage change in the first power supply system 2.

Subsequently, in step S120, the control device 10A determines whether or not there is a change in the drive request information of the ISG 33 which is the power consuming/generating unit. Here, in a case where a state of the ISG 33 transitions from a non-operating state to an operating state, in a case where the state of the ISG 33 transitions from the operating state to the non-operating state, and in a case where an operating amount request changes in a state where the ISG 33 is operating, it is determined that there is a change in the drive request information of the ISG 33.

Regarding the change in the operating amount request of the ISG 33, in a case where the change amount of the operating amount of the ISG 33 is equal to or greater than a threshold set in advance, it is determined that there is a change in the operating amount request, while, in a case where the change is less than the threshold, it is determined that there is no change in the operating amount request. Note that the drive request information in a case where there is a change in the drive request information of the ISG 33 corresponds to change information of the present disclosure.

If there is a change in the drive request information of the ISG 33, the processing proceeds to step S130, and correction is performed on a reference voltage in response to a change in a drive state of the ISG 33 which is the power consuming/generating unit.

Here, the control device 10A estimates a change amount of the voltage of the first power supply system 2 by change of the drive state of the ISG 33 using an arithmetic equation, or the like, prepared in advance, and obtains this estimation result as a correction voltage. For example, in a case where the ISG 33 operates as a motor and the change amount of the voltage of the first power supply system 2 is estimated as −2.0 V, the correction voltage is −2.0 V. For example, in a case where the ISG 33 operates as a generator and the change amount of the voltage of the first power supply system 2 is estimated as 1.0 V, the correction voltage is 1.0 V.

Subsequently, in step S140, the power supply state of the electric load 37 is calculated based on the correction voltage. That is, a power supply state for causing the electric load 37 to generate constant output even if the voltage of the first power supply system 2 changes by the correction voltage, is calculated.

Subsequently, in step S160, a command is transmitted to the power supply state adjusting unit 36 so that the state becomes the calculated power supply state. The power supply state adjusting unit 36, which receives this command, sets the power supply state of the electric load 37 so as to be a power supply state in accordance with the command. When the processing in step S160 ends, the power supply control processing is repeated from step S110.

Meanwhile, if there is no change in the drive request information of the ISG 33 which is the power consuming/generating unit in step S120, the processing proceeds to step S150, and the power supply state of the electric load 37 corresponding to a reference voltage is calculated using the voltage of the first power supply system 2 as the reference voltage. Note that the reference voltage is not limited to the voltage of the first power supply system 2. The power supply state of the electric load 37 may be calculated based on an arbitrary reference voltage set in advance. Thereafter, the processing proceeds to step S160 described above.

Figure 3:
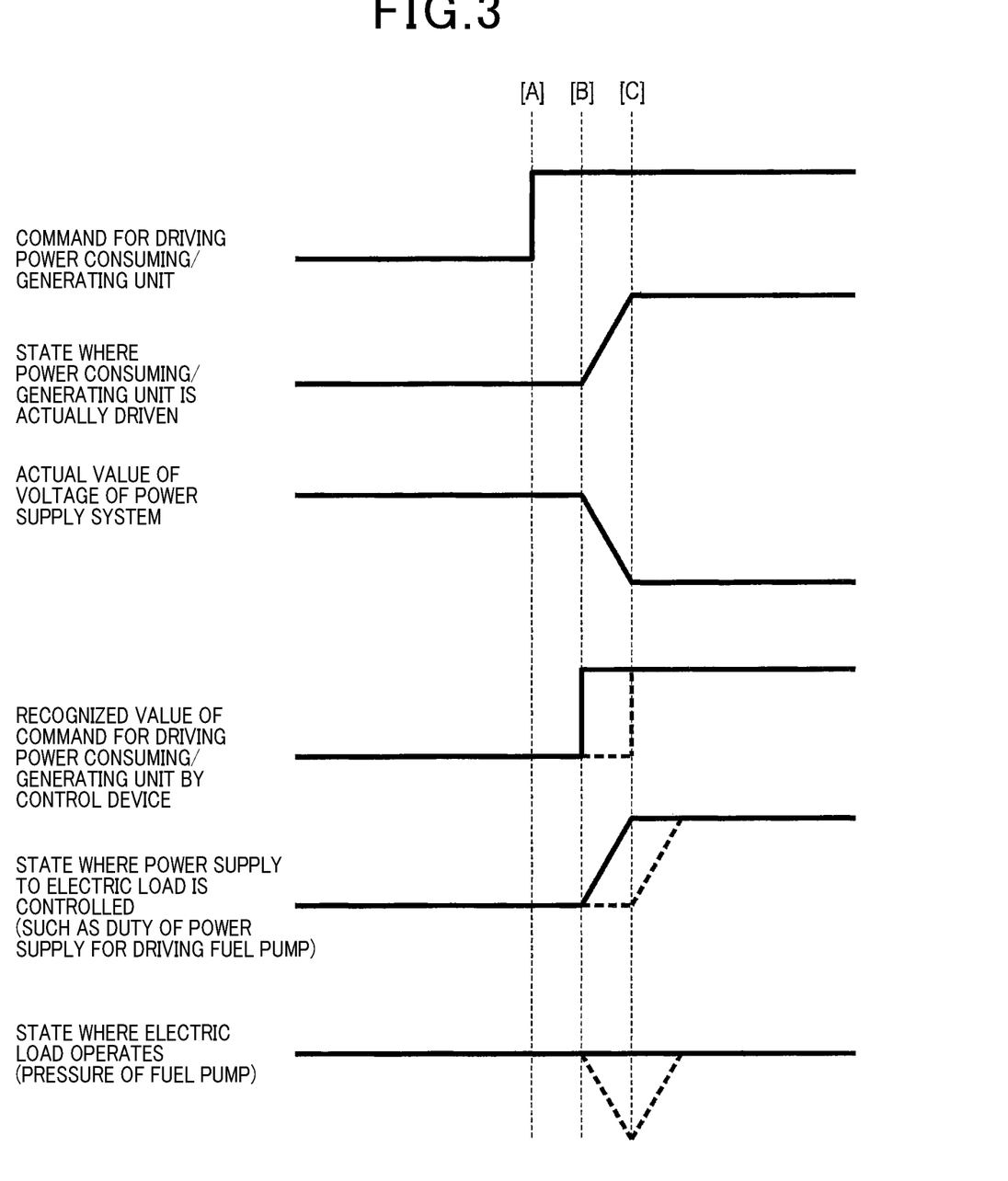
FIG. 3 is a timing chart illustrating an operation example by the power supply control processing.

FIG. 3 illustrates an operation example by such power supply control processing. As illustrated in FIG. 3, when the ECU 32 transmits a drive command for the ISG 33 at a timing [A], the ISG 33 which recognizes this drive command, for example, starts driving at a timing [B] which is later than the timing [A], and, further, reaches a set control amount at a timing [C] which is later than the timing [B].

At this time, the voltage of the first power supply system 2 to which the ISG 33 and the electric load 37 are connected, that is, an actual value of the voltage of the power supply system in FIG. 3, decreases from the timing [B] to the timing [C] as a result of the ISG 33 consuming power. Further, a recognized value of the drive command by the control device 10A changes from 0 to 1 at the timing [B]. That is, the control device 10A can recognize the drive command at the timing [B].

As a result, the control device 10A can transmit a command to change the power supply state, in response to voltage drop, to the power supply state adjusting unit 36 at the timing [B], so that the power supply state of the electric load 37 can be maintained at a substantially constant state. That is, a pressure of a fuel discharged by a fuel pump which is the electric load 37 is maintained substantially constant regardless of the voltage drop.

Note that FIG. 3 indicates an operation example in a case where the voltage of the first power supply system 2 is directly monitored with a dashed line. While, in the configuration of the present embodiment, the control device 10A changes the power supply state of the electric load 37 by detecting a parameter indicating a sign of voltage change, such as a drive command for the ISG 33, at the timing [B], in a case where the voltage of the first power supply system 2 is directly monitored, for example, the control device 10 can detect that the voltage is actually changed at the timing [C] which is later than the timing [B].

Therefore, because the control device 10A cannot transmit a command to change the power supply state in response to the voltage drop, to the power supply state adjusting unit 36, unless the timing [C] is reached, there is a possibility that, in the power supply state of the electric load 37, output may be temporarily lowered. That is, the pressure of the fuel discharged by the fuel pump which is the electric load 37 temporarily decreases due to the voltage drop, and thereafter recovers when the power supply state is changed.

1-3. Advantages

According to the first embodiment described in detail above, the following advantages are provided.

(1a) The above-described vehicle power supply system 1A includes the first battery 31, the second battery 41, the electric load 37, and the control device 10A. The first battery 31 is connected to the first power supply system 2, and the second battery 41 is connected to the second power supply system 4 different from the first power supply system 2.

The electric load 37 is connected to the first power supply system 2. The control device 10A is connected to the second power supply system 4 which is a power supply system different from the electric load 37, and is configured to acquire a parameter indicating a sign of voltage change of the first power supply system 2, and set the power supply state of the electric load 37 in response to the sign indicated by the parameter.

According to such a vehicle power supply system 1A, because the control device 10A connected to the second power supply system 4 can recognize voltage change of the first power supply system 2 using the parameter indicating the sign of the voltage change, before the voltage change of the first power supply system 2 occurs or without delay after the voltage change of the first power supply system 2 occurs, the control device 10A can set the power supply state of the electric load 37 in response to the voltage change. Therefore, it is possible to suppress delay by communication and suppress increase in cost and space due to provision of a dedicated line, or the like, for suppressing delay. That is, it is, therefore, possible to cause a controlled unit, such as the electric load 37, to operate favorably. Specifically, it is possible to suppress occurrence of inconvenience in the power supply state of the controlled unit due to delay by communication for recognizing the voltage of the system to be controlled.

(1b) The above-described vehicle power supply system 1A further includes the ISG 33. The ISG 33 is connected to the first power supply system 2 and is configured to consume or generate power. Further, the control device 10A is configured to acquire change information for changing the operating state of the ISG 33 as a parameter indicating a sign of voltage change.

According to such a vehicle power supply system 1A, because change in the operating state of the ISG 33 is regarded as a sign of voltage change, the power supply state of the electric load 37 can be appropriately set while the voltage change by operation of the ISG 33 is taken into account.

(1c) In the above-described vehicle power supply system 1A, the control device 10A is configured to acquire, as change information, information indicating that the requirements for the ISG 33 to perform operation are fulfilled.

According to such a vehicle power supply system 1A, it is possible to set the power supply state of the electric load 37 while predicting that potential of the first power supply system 2 will change by whether or not the requirements for the ISG 33 to perform operation are fulfilled.

(1d) In the above-described vehicle power supply system 1A, the control device 10A is configured to acquire the the operating amount request representing a request value of the operating amount for the ISG 33 as the change information.

According to such a vehicle power supply system 1A, it is possible to predict that a state of power consumption and power generation of the ISG 33 will be changed by acquiring the operating amount request.

(1e) In the above-described vehicle power supply system 1A, energy density of the first battery 31 is configured to be different from energy density of the second battery 41. In general, a battery having high energy density is excellent in performance but expensive.

According to such a vehicle power supply system 1A, because a battery having high energy density and a battery having low energy density are employed in combination in the vehicle power supply system 1A, by selecting a power supply system to be connected in accordance with use of the equipment, it is possible to achieve a good balance between cost and performance of the battery.

(1f) In the above-described vehicle power supply system 1A, a voltage of the first battery 31 is configured to be different from a voltage of the second battery 41.

Such a vehicle power supply system 1A can be configured such that a battery having a higher voltage performs charging and discharging to equipment requiring a higher operating voltage such as a generator for energy regeneration and travelling, and a battery having a lower voltage performs charging and discharging to equipment requiring a lower operating voltage such as existing accessory equipment.

That is, in the vehicle power supply system 1A, because it is possible to select and connect a power supply system having an appropriate voltage in accordance with use of the equipment, it is possible to efficiently utilize power.

(1g) The above-described vehicle power supply system 1A further includes the DC-DC converter 20. The DC-DC converter 20 is configured to be connected while transforming voltages of the first power supply system 2 and the second power supply system 4.

According to such a vehicle power supply system 1A, power can be interchanged between the first power supply system 2 and the second power supply system 4 using the DC-DC converter 20.

2. Second Embodiment

2-1. Differences from First Embodiment

Because a basic configuration of the second embodiment is similar to that of the first embodiment, differences will be described below. Note that the same reference numerals as those in the first embodiment will indicate the same components, and the preceding description will be referred to.

Figure 4:
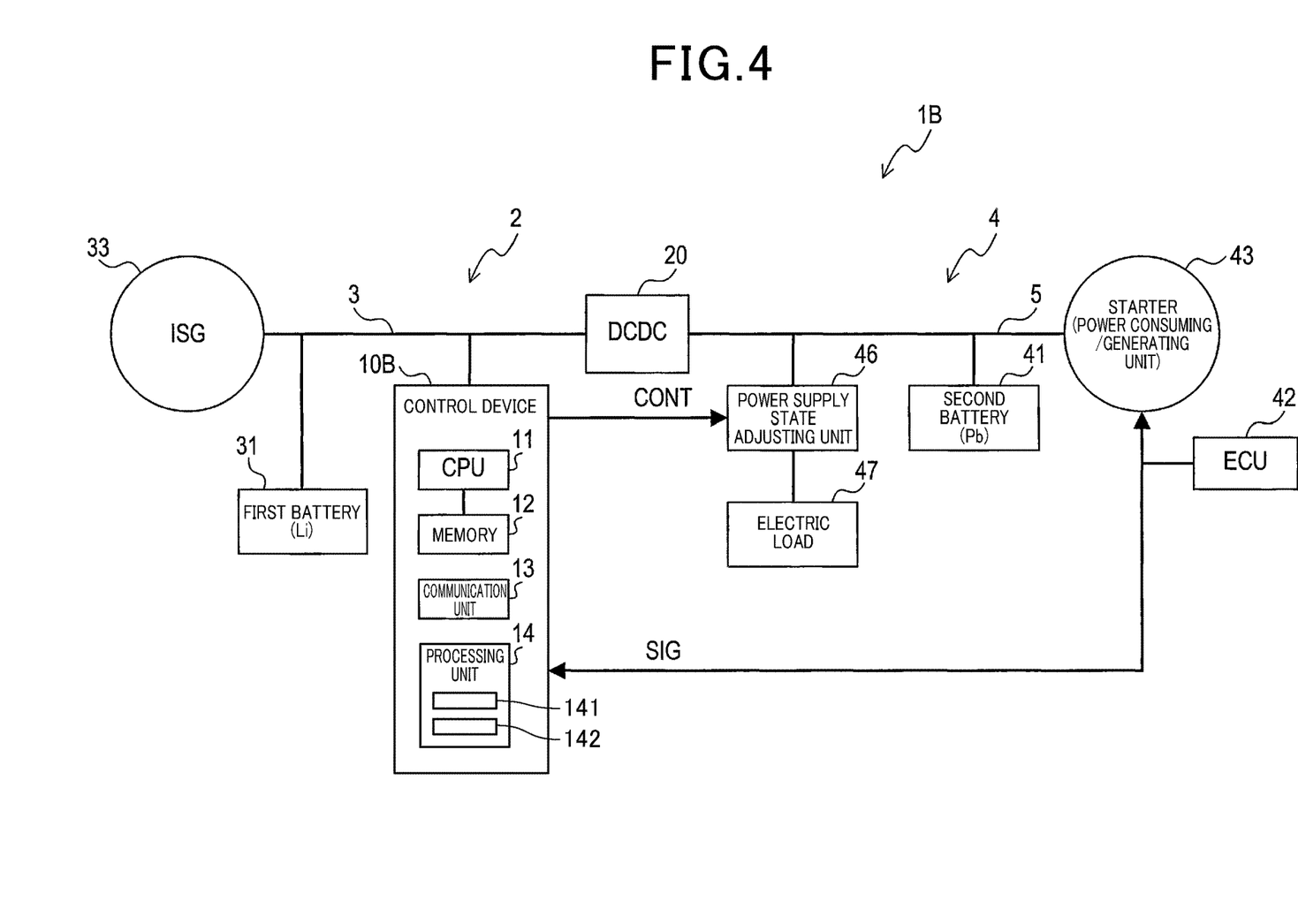
FIG. 4 is a block diagram illustrating a configuration of a vehicle power supply system according to a second embodiment.

In the first embodiment described above, the control device 10A is connected to the second power supply system 4 and is configured to control the electric load 37 connected to the first power supply system 2. In contrast, a vehicle power supply system 1B in the second embodiment is different from that in the first embodiment in that a control device 10B is connected to the first power supply system 2 and is configured to control an electric load 47 connected to the second power supply system 4.

2-2. Configuration

The vehicle power supply system 1B according to the second embodiment includes the control device 10B, an ECU 42, and a power supply state adjusting unit 46, and the electric load 47 as illustrated in FIG. 4, in place of the control device 10A, the ECU 32, the power supply state adjusting unit 36, and the electric load 37 in the first embodiment.

While the control device 10B has a configuration similar to that of the control device 10A, the control device 10B is connected to the first power supply system 2. Meanwhile, the power supply state adjusting unit 46 and the electric load 47 are connected to the second power supply system 4. The power supply state adjusting unit 46 has a configuration similar to that of the power supply state adjusting unit 36, and adjusts the power supply state of the electric load 47 in accordance with a command from the control device 10B. The electric load 47 is configured as, for example, a steering motor, or the like, which assists steering operation.

The ECU 42 uses the starter 43 as a power consuming/generating unit, and transmits to the starter 43 change information for changing an operating state of the starter 43, such as a drive request. The control device 10B is configured to be able to monitor the change information.

With such a configuration, the control device 10B controls the power supply state of the electric load 47 by performing power supply control processing similar to that described above.

2-3. Advantages

According to the second embodiment described in detail above, the advantage (1a) of the first embodiment described above is provided.

3. Third Embodiment

3-1. Differences from First Embodiment

Figure 5:
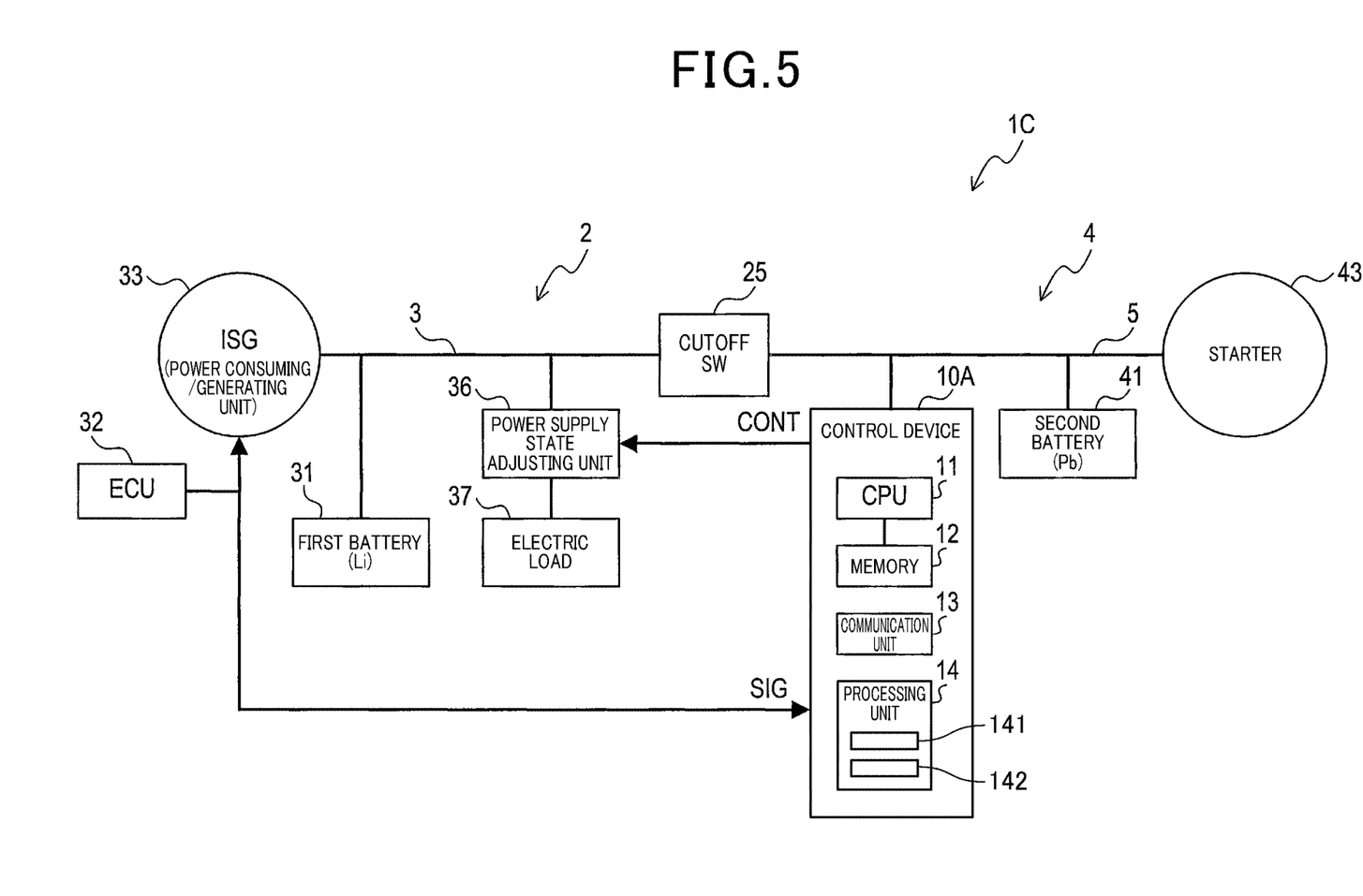
FIG. 5 is a block diagram illustrating a configuration of a vehicle power supply system according to a third embodiment.

While, in the first embodiment described above, the first power supply system 2 and the second power supply system 4 are connected by the DC-DC converter 20, a vehicle power supply system 1C of the third embodiment is different from that in the first embodiment in that the first power supply system 2 and the second power supply system 4 are connected by a cutoff switch 25.

3-2. Configuration

The vehicle power supply system 1C according to the third embodiment includes the cutoff switch 25 as illustrated in FIG. 5 in place of the DC-DC converter 20 according to the first embodiment.

Here, the first battery 31 in the vehicle power supply system 1C is configured as a lithium ion battery in which a rated voltage is set in a similar manner to that in the second battery 41. That is, the rated voltage of the first battery 31 is set at 12 V.

The cutoff switch 25 is disposed between the first power supply line 3 of the first power supply system 2 and the second power supply line 5 of the second power supply system 4, and switches a state between a state where the first power supply line 3 and the second power supply line 5 are connected and a state where the first power supply line 3 and the second power supply line 5 are disconnected in response to an external command from an arbitrary device such as the control device 10A.

3-3. Advantages

According to third embodiment described in detail above, the advantage (1a) of the first embodiment described above is provided, and also the following advantages are provided.

(3a) In the vehicle power supply system 1C, in a state where the cutoff switch 25 connects the first power supply line 3 and the second power supply line 5, power can be given from a higher voltage side to a lower voltage side out of the first power supply system 2 and the second power supply system 4.

(3b) Because the vehicle power supply system 1C includes the cutoff switch 25, a configuration of the entire system can be simplified compared to the configuration including the DC-DC converter 20.

4. Fourth Embodiment

4-1. Differences from Second Embodiment

Figure 6:
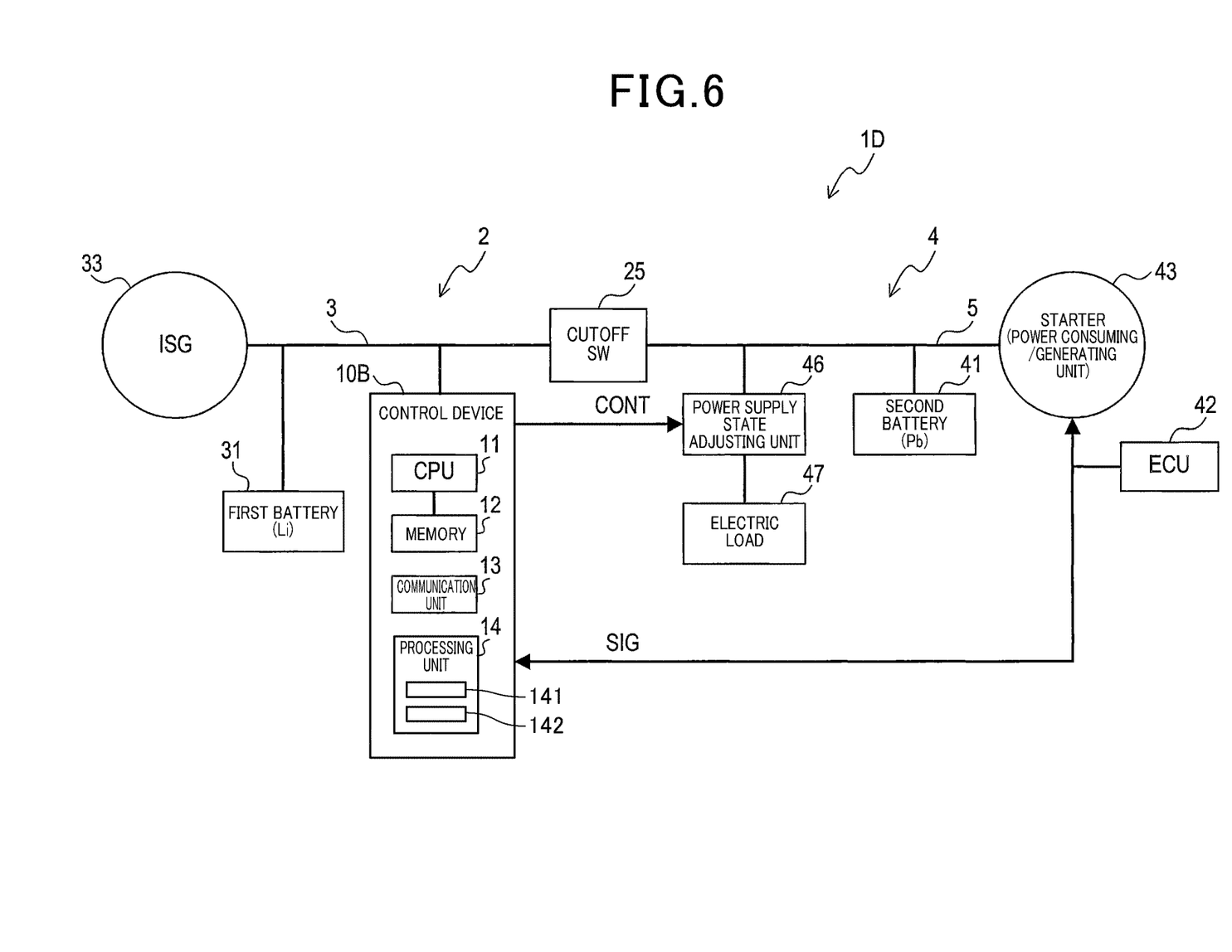
FIG. 6 is a block diagram illustrating a configuration of a vehicle power supply system according to a fourth embodiment.

In a similar manner to the vehicle power supply system 1C in the third embodiment, the fourth embodiment described above is different from the second embodiment in that the cutoff switch 25 is provided in place of the DC-DC converter 20 in the configuration of the second embodiment.

4-2. Configuration

A vehicle power supply system 1D according to the fourth embodiment includes the cutoff switch 25 as illustrated in FIG. 6 in place of the DC-DC converter 20, in the vehicle power supply system 1B of the second embodiment.

Note that the first battery 31 in the vehicle power supply system 1D is configured as a lithium ion battery in which a rated voltage is set at 12 V in a similar manner to the second battery 41.

4-3. Advantages

According to the fourth embodiment described in detail above, the advantage (1a) of the first embodiment and the advantages (3a) (3b) of the third embodiment described above are provided.

5. Other Embodiments

While the embodiments of the present disclosure have been described above, the present disclosure is not limited to the above-described embodiments, and can be implemented with various modifications.

(5a) While, in the above-described embodiments, an example where the electric loads 37 and 47 are fuel pumps or steering motors has been described, the present disclosure is not limited to this. As the electric loads 37 and 47, it is possible to apply electrical equipment which controls the power supply state based on a power supply voltage. As the electric loads 37 and 47, it is, for example, also possible to apply a fuel injection device such as an injector, a headlight, a blower fan, a heater, or X-ByWire equipment such as a throttle-by-wire, a brake-by-wire and a steer-by-wire.

(5b) While, in the above-described embodiments, an example where the power consuming/generating unit is the ISG 33 and the starter 43 has been described, the present disclosure is not limited to this. Arbitrary equipment configured to consume or generate power can be applied as the power consuming/generating unit. It is, for example, also possible to employ a power steering device, a compressor for an electric air conditioner, an electric supercharger, or the like, as the power consuming/generating unit.

(5c) While, in the above-described embodiments, an example where the controlled unit is the electric loads 37 and 47 has been described, the present disclosure is not limited to this. As the controlled unit, it is possible to employ equipment which connects and disconnects a plurality of power supply systems, such as the DC-DC converter 20 and the cutoff switch 25, or arbitrary equipment which is affected by the voltage of the power supply system.

(5d) A plurality of functions of one component in the above-described embodiments may be realized by a plurality of components, or one function of one component may be realized by a plurality of components. Further, a plurality of functions of a plurality of components may be realized by one component, or one function to be realized by a plurality of components may be realized by one component. Still further, part of the components of the above-described embodiments may be omitted. In addition, at least part of the components of the above-described embodiments may be added to or replaced with the components in another embodiment.

(5e) The present disclosure can be realized in various modes, such as, in addition to the vehicle power supply systems 1A, 1B, 1C, and 1D described above, devices which become components of the vehicle power supply systems 1A, 1B, 1C, and 1D, a program for causing a computer to function as the vehicle power supply systems 1A, 1B, 1C, and 1D, a non-transitory computer-readable recording medium such as a semiconductor memory in which this program is recorded, and an operation control method of electrical equipment.

In the present disclosure, each of the control devices 10A and 10B in the above-described embodiments corresponds to a power supply control device. The electric loads 37 and 47 in the above-described embodiments correspond to a controlled unit in the present disclosure. Further, the ISG 33 in the first embodiment and the third embodiment, and the starter 43 in the second embodiment and the fourth embodiment correspond to a power consuming/generating unit in the present disclosure.

Further, the first power supply system 2 in the first embodiment and the third embodiment, the second power supply system 4 in the second embodiment and the fourth embodiment correspond to a controllee power supply system, that is a power supply system to be controlled, and the second power supply system 4 in the first embodiment and the third embodiment, and the first power supply system 2 in the second embodiment and the fourth embodiment correspond to a controller power supply system, that is a power supply system to control the controllee power supply system. In addition, the processing in step S110 among the processing to be executed by the control devices 10A and 10B in each of the above-described embodiments corresponds to the parameter acquiring unit 141, and the processing in steps S140, S150, and S160 in the above-described embodiments corresponds to the operation setting unit 142.

What is claimed is:

1. A vehicle power supply system having a plurality of power supply systems, the vehicle power supply system comprising:
    a first power supply system and a second power supply system different from the first power supply system, as the plurality of power supply systems;
    a controlled unit connected to a controllee power supply system that is one of the first power supply system and the second power supply system;
    a parameter acquiring unit connected to a controller power supply system that is another one of the first power supply system and the second power supply system, and configured to acquire a parameter indicating a sign of voltage change of the controllee power supply system; and
    an operation setting unit configured to predict the voltage change of the controllee power supply system in response to the sign indicated by the parameter and set a power supply state of the controlled unit indicating at least one of a number of drive pulses per unit time, a duty ratio, and a drive current so as to obtain a constant output from the controlled unit.

2. The vehicle power supply system according to claim 1, further comprising:
    a power consuming/generating unit connected to the controllee power supply system and configured to consume or generate power,
    wherein the operation setting unit is configured to acquire change information for changing an operating state of the power consuming/generating unit as the parameter indicating the sign of the voltage change.

3. The vehicle power supply system according to claim 2, wherein the operation setting unit is configured to acquire, as the change information, information indicating that a requirement for the power consuming/generating unit to operate is fulfilled.

4. The vehicle power supply system according to claim 2, wherein the operation setting unit is configured to acquire an operating amount request for the power consuming/generating unit as the change information.

5. The vehicle power supply system according to claim 1, further comprising:
    a first battery connected to the first power supply system; and
    a second battery connected to the second power supply system,
    wherein an energy density of the first battery is different from an energy density of the second battery.

6. The vehicle power supply system according to claim 5, wherein a voltage of the first battery is different from a voltage of the second battery.

7. The vehicle power supply system according to claim 1, further comprising:
    a DC-DC converter connecting the first power supply system and the second power supply system to transform voltages of the first power supply system and the second power supply system.

8. A power supply control device which is connected to a controller power supply system that is one of a first power supply system to which a first battery is connected and a second power supply system to which a second battery is connected, the power supply control device comprising:
    a parameter acquiring unit configured to acquire a parameter indicating a sign of voltage change of a controllee power supply system, that is another one of the first power supply system and the second power supply system, to which a controlled unit is connected; and
    a control setting unit configured to predict the voltage change of the controllee power supply system in response to the sign indicated by the parameter and set a power supply state of the controlled unit indicating at least one of a number of drive pulses per unit time, a duty ratio, and a drive current so as to obtain a constant output from the controlled unit.

9. The power supply control device according to claim 8, wherein the acquiring unit is configured to acquire change information for changing an operating state of a power consuming/generating unit which is connected to the controllee power supply system and which is configured to consume or generate power, as the parameter indicating the sign of the voltage change.

10. The power supply control device according to claim 9, wherein the acquiring unit is configured to acquire, as the change information, information indicating that a requirement for the power consuming/generating unit to operate is fulfilled.

11. The power supply control device according to claim 9, wherein the acquiring unit is configured to acquire an operating amount request for the power consuming/generating unit as the change information.

12. A vehicle power supply system having a plurality of power supply systems, the vehicle power supply system comprising:
    a first power supply system and a second power supply system different from the first power supply system, as the plurality of power supply systems;
    a controlled unit connected to a controllee power supply system that is one of the first power supply system and the second power supply system;
    a parameter acquiring unit connected to a controller power supply system that is another one of the first power supply system and the second power supply system, and configured to acquire a parameter indicating a sign of voltage change of the controllee power supply system; and
    an operation setting unit configured to set a power supply state of the controlled unit in response to the sign indicated by the parameter;
    a power consuming/generating unit connected to the controllee power supply system and configured to consume or generate power,
    wherein the operation setting unit is configured to acquire, from a control unit configured to control operations of the power consuming/generating unit, change information for changing an operating state of the power consuming/generating unit as the parameter indicating the sign of the voltage change.

13. The vehicle power supply system according to claim 12, wherein the operation setting unit is configured to acquire, as the change information, information indicating that a requirement for the power consuming/generating unit to operate is fulfilled.

14. The vehicle power supply system according to claim 12, wherein the operation setting unit is configured to acquire an operating amount request for the power consuming/generating unit as the change information.

15. The vehicle power supply system according to claim 12, further comprising:
- a first battery connected to the first power supply system; and
- a second battery connected to the second power supply system,
- wherein an energy density of the first battery is different from an energy density of the second battery.

16. The vehicle power supply system according to claim 15,
- wherein a voltage of the first battery is different from a voltage of the second battery.

17. The vehicle power supply system according to claim 12, further comprising:
- a DC-DC converter connecting the first power supply system and the second power supply system to transform voltages of the first power supply system and the second power supply system.

18. A power supply control device which is connected to a controller power supply system that is one of a first power supply system to which a first battery is connected and a second power supply system to which a second battery is connected, the power supply control device comprising:
- a parameter acquiring unit configured to acquire a parameter indicating a sign of voltage change of a controllee power supply system that is another one of the first power supply system and the second power supply system, to which a controlled unit is connected; and
- a control setting unit configured to set a power supply state of the controlled unit in response to the sign indicated by the parameter,
- wherein the acquiring unit is configured to acquire change information for changing an operating state of a power consuming/generating unit which is connected to the controllee power supply system and which is configured to consume or generate power, as the parameter indicating the sign of the voltage change.

19. The power supply control device according to claim 18,
- wherein the acquiring unit is configured to acquire, as the change information, information indicating that a requirement for the power consuming/generating unit to operate is fulfilled.

20. The power supply control device according to claim 18,
- wherein the acquiring unit is configured to acquire an operating amount request for the power consuming/generating unit as the change information.

* * * * *